United States Patent
Boldy et al.

(10) Patent No.: US 8,327,061 B2
(45) Date of Patent: Dec. 4, 2012

(54) REDUCING OCCUPANCY OF DIGITAL STORAGE DEVICES

(75) Inventors: Manfred Boldy, Horb a.N. (DE); Peter Sander, Mannheim (DE); Hermann Stamm-Wilbrandt, Eberbach (DE)

(73) Assignee: International Business Machines Corporation, Armonk, NY (US)

( * ) Notice: Subject to any disclaimer, the term of this patent is extended or adjusted under 35 U.S.C. 154(b) by 11 days.

(21) Appl. No.: 12/892,468

(22) Filed: Sep. 28, 2010

(65) Prior Publication Data

US 2011/0082998 A1    Apr. 7, 2011

Related U.S. Application Data

(63) Continuation of application No. 11/019,099, filed on Dec. 22, 2004, now abandoned.

(30) Foreign Application Priority Data

Dec. 22, 2003   (EP) ..................... 03104922

(51) Int. Cl.
| | |
|---|---|
| G06F 12/00 | (2006.01) |
| G06F 13/00 | (2006.01) |
| G06F 13/28 | (2006.01) |
| G06F 7/00 | (2006.01) |
| G06F 17/00 | (2006.01) |
| G06F 15/16 | (2006.01) |

(52) U.S. Cl. .................. 711/100; 707/664; 709/247
(58) Field of Classification Search ............... 707/664; 709/247
See application file for complete search history.

(56) References Cited

U.S. PATENT DOCUMENTS

| | | | |
|---|---|---|---|
| 5,559,991 | A | 9/1996 | Kanfi |
| 5,732,265 | A | 3/1998 | Dewitt et al. |
| 5,732,365 | A | 3/1998 | Howard et al. |
| 5,758,347 | A | 5/1998 | Lo et al. |
| 5,765,173 | A | 6/1998 | Cane et al. |
| 5,933,842 | A | 8/1999 | Ross |
| 6,092,145 | A | 7/2000 | Kigami et al. |

(Continued)

FOREIGN PATENT DOCUMENTS

JP    63027936 A   *   2/1988

OTHER PUBLICATIONS

Parlante, N., Linked List Basics, 2001, Stanford CS Education Library, 26 pages.*

(Continued)

*Primary Examiner* — Sanjiv Shah
*Assistant Examiner* — Gary W Cygiel
(74) *Attorney, Agent, or Firm* — Whitham, Curtis, Christofferson & Cook, P.C.; Arthur J. Samodovitz (57) ABSTRACT

A digital data storage device physically stores blocks of identical data only once on its storage medium wherein a second or even further identical blocks are stored only as reference referring to the first block of these identical blocks. By this technique, storage of duplicate data is most effectively avoided on the lowest storage level of the disk storage device, even in cases where identical blocks are written by different operating Systems. In the preferred embodiment, the underlying storage medium (magnetic hard disk, optical disk, tape, or M-RAM) is segmented into two areas, the first area particularly comprising a relatively small block reference table and the remaining physical storage area for storing real blocks of information.

22 Claims, 10 Drawing Sheets

U.S. PATENT DOCUMENTS

| | | |
|---|---|---|
| 6,374,266 B1 | 4/2002 | Shnelvar |
| 6,505,305 B1 | 1/2003 | Olarig |
| 6,889,297 B2 | 5/2005 | Krapp et al. |
| 7,143,251 B1 | 11/2006 | Patterson |
| 2002/0169934 A1 | 11/2002 | Krapp et al. |
| 2002/0178176 A1 | 11/2002 | Sekiguchi et al. |
| 2002/0178332 A1 | 11/2002 | Wilson et al. |
| 2004/0103254 A1 | 5/2004 | Satoyama et al. |

OTHER PUBLICATIONS

Kanda, A., English Abstract of JP 63027936 A, 1988, 2 pages.*

* cited by examiner

High level formatting of storage (initialization)

"prepend b to list with fingerprint fn"

FIG. 9C

"Initialize U as empty stack"

FIG. 10A

"push(U,b)"

FIG. 10B

"b = pop(U)"

FIG. 10C

REDUCING OCCUPANCY OF DIGITAL STORAGE DEVICES

CROSS-REFERENCE TO RELATED APPLICATIONS

This application is a continuation of U.S. patent application Ser. No. 11/019,099, filed Dec. 22, 2004 now abandoned, which is hereby fully incorporated by reference and the priority of which is hereby claimed.

FIELD OF THE INVENTION

The invention generally relates to digital data storage devices such as magnetic hard disk drives, optical disk drives, tape storage devices, semiconductor-based storages emulating or virtually realizing hard disk drives like solid hard disks or RAM disks storing information in continuous data blocks. More specifically, the invention concerns operation of such a digital storage device in order to reduce storage occupancy.

BACKGROUND OF THE INVENTION

In computer hardware technology it is well-known to use disk storage devices like hard disk drives (HDDs) or optical disk drives built-up of one or a stack of multiple hard disks (platters) on which data is stored on a concentric pattern of magnetic/optical tracks using read/write heads. These tracks are divided into equal arcs or sectors. Two kinds of sectors on such disks are known. The first and at the very lowest level is a servo sector. In the case of a magnetic storage device, when the hard disks are manufactured, a special binary digit (bit) pattern is written in a code called 'gray code' on the surface of the disks, while the drive is open in a clean room, with a device called "servo writer".

This gray code consists of successive numbers that differ by only a single bit like the three bit code sequence, 000', 001', 011', 010', 110', etc. Although many gray codes are possible, one specific type of gray code is considered the gray code of choice because of its efficiency in computation. Although there are other schemes, the gray code is written in a wedge at the start of each sector. There are a fixed number of servo sectors per track and the sectors are adjacent to one another. This pattern is permanent and cannot be changed by writing normal data to the disk drive. It also cannot be changed by low-level formatting the drive.

Disk drive electronics use feedback from the heads which read the gray code pattern, to very accurately position and constantly correct the radial position of the appropriate head over the desired track, at the beginning of each sector, to compensate for variations in disk (platter) geometry caused by mechanical stress and thermal expansion or contraction.

At the end of the manufacturing process, the hard disk storage devices generally are low-level formatted. Afterwards, only high-level operations are performed such as known partitioning procedures, high-level formatting and read/write of data in the form of blocks as mentioned above. All high-level operations can be derived from only two base operations, namely a BlockRead and a BlockWrite operation. Thus even partitioning and formatting, the latter independently of the underlying formatting scheme like MS-DOS FAT, FAT32, NTFS or LINUX EXT2, are accomplished using the mentioned base operations.

When high-level formatting such a disk drive, each disk (platter) is arranged into blocks of fixed length by repeatedly writing with a definite patch like "$5A". After formatting, when storing data in such disk storage devices, these data are stored as continuous data segments on the disk (platter). These continuous data segments are also referred to as "data" or, simply, "blocks" and such terminology will be used hereinafter.

It is to be noted that, in known tape storage devices, data are stored in form of data blocks, as well. The only difference between the above described hard disk devices and these tape storage devices is that data stored on HDDs are directly accessible by means of the read/write head (so-called direct memory access DMA operation mode), whereas data stored on tapes are only accessible in a sequential manner since the tape has to be wound to the location where the data of interest are stored before these data can be accessed.

In order to minimize storage occupancy in those storage devices, it is known to avoid duplicate data. A disk drive system comprising a sector buffer having a plurality of segments for storing data and reducing storage occupancy is disclosed in U.S. Pat. No. 6,092,145 assigned to the assignee of the present invention. Generally, HDD systems require a sector buffer memory to temporarily store data in the HDD system because the data transfer rate of the disk is not equal to the data transfer rate of a host computer and thus a sector buffer is provided in order to increase the data I/O rate of new high capacity HDD systems. The system described therein particularly includes a controller for classifying data to be stored in the sector buffer and for storing a portion of the classified data in a segment of the sector buffer such that the portion of classified data stored in the segment is not stored in any other segment in the sector buffer. Therefore, the sector buffer is handled more efficiently, and the computational load to check for duplicated data is reduced and the disk drive thus improves data transfer efficiency.

The subject matter of the U.S. Pat. No. 6,092,145, in other words, concerns an improved method for read-ahead and write-ahead operations using a sector buffer wherein duplicates are eliminated only in the sector buffer implemented on the hard disk or a separate Random Access Memory (RAM), in order to provide the improved transfer efficiency mentioned above.

Another approach for optimizing storage occupancy is disclosed in U.S. Pat. No. 5,732,265 assigned to Microsoft Corporation. Particularly disclosed is an encoder for use in CD-ROM pre-mastering software. The storage in the computer readable recording medium (CD-ROM) is optimized by eliminating redundant storage of identical data streams for duplicate files whereby two files having equivalent data streams are detected and encoded as a single data stream referenced by the respective directory entries of the files. More particularly addressed therein is the problem of data consistency that arises when multiple files are encoded as a single data stream and when these files are separately modified by an operating system or application program. In U.S. Pat. No. 5,732,265 it is further disclosed to implement such an encoder in an operating system or file system to dynamically optimize storage in the memory system of the computer wherein the above-described mechanism is applied at the time a file is created or saved on a data volume to detect whether the file is a duplicate of another existing file on the data volume.

The above-discussed prior art approaches, however, have a disadvantage in that they do not address reduction of storage occupancy of stored user data (e.g. within a file or between files) which is stored in an above identified data storage device. Only as an example, it is referred to text or picture files where blocks frequently are fully represented by a recurring data byte being regarded as duplicate data in the present context. Nevertheless, as computer usage and application programs supporting it has become more sophisticated, there is an increased likelihood that relatively large portions of individual (possibly large) files comprising many blocks of data may be duplicated in many stored files; letterhead and watermarks stored in documents and portions of image files representing relatively large image areas having little detail therein being only a few examples. Further, as the capacity of memory devices increases, it becomes even more clearly impractical to compare a block to the stored with all blocks which may have been previously stored in one or more memory devices to deter mine if an identical block has been previously stored.

SUMMARY OF THE INVENTION

It is therefore an object of the present invention to provide an improved mechanism for minimizing data occupancy in an above specified digital data storage device.

A further object is to provide such a data storage device with enhanced data access and transmission performance.

Another object is to provide a mechanism for minimizing data occupancy in such a data storage device that is transparent to an operating system of a computer using the data storage device.

The above objects are achieved by a digital data storage device and a method for operating same in accordance with the respective independent claims. Advantageous features are subject matter of the corresponding subclaims.

The underlying concept of the invention is to physically store blocks of identical data only once on the storage medium of the data storage device wherein a second block or even further identical blocks are stored only as reference(s) referring to the first block of these identical blocks. As a consequence, storage of duplicate data is most effectively avoided at the lowest storage level of the disk storage device, even in cases where identical blocks are written by different operating systems. The proposed method thereby effectively avoids data duplicates being created on the sector level of the storage medium. The proposed mechanism is operating system independent or fully transparent to an operating system, respectively, since it operates on the pre-mentioned block/sector level which is not known by the operating system. In contrast to the above-discussed known approaches, the invention proposes, when writing to an existing block of information onto the storage medium, not to modify the real block itself but, moreover, to modify only the relatively small reference table. Thus identical blocks of information are stored only once on the block level of the storage device and accessed or addressed only using reference information stored in the reference table.

In the preferred embodiment, the underlying storage medium (magnetic hard disk (platter), optical disk, tape, or M-RAM) is segmented into two areas, the first area comprising a relatively small block reference table (in the following briefly referred to as "reference table") and the remaining physical storage area for storing real blocks of information. Despite differences in the storage mechanism, it is emphasized that the present invention can also be applied to tape storage devices since it does not depend on the underlying data access mechanism.

The possible entries of the reference table, in another embodiment, are continuously numbered wherein the reference table contains, for each real block, at least one entry. This entry contains a unique identifier for identifying the physical sector where the real block is stored in the remaining physical storage area. The length of this entry is preferably defined as the maximum amount of required binary digits (bits) for real sector IDs.

In yet another embodiment, a real block stored in the second area of the storage medium comprises, in addition to other required information like a header, the stored data and a Cyclic Redundancy Checking (CRC), a reference counter. That counter counts the number of references to the present real block. The reference counter is preferably used to identify whether a block is used or not.

According to another aspect, as the result of a low-level formatting of the storage medium after manufacture/assembly of the storage device, the number of real blocks available for storing equals the number of entries of the reference table. Only later, during operation of the storage medium where the second area of the storage medium is filled with blocks of real data, the size of the reference table will be adapted or its optimum size being determined. Thus the optimum size can be re-calculated on a periodic time basis.

According to still another aspect of the invention, during the above-described low-level formatting or a successive foil/tatting step after the low-level formatting of a so-called "intermediate format" of the storage medium, three tables, the above mentioned reference table, a linkage or chain table and a fingerprint table are created. Implementation of the fingerprint table presumes that for each block to be written a "fingerprint" can be calculated. An exemplary fingerprint algorithm is a cyclic redundancy check (CRC) mechanism which preferably is used for calculation of the entries of the fingerprint table. CRC is a well-known mechanism of checking for errors in data that has been transmitted on a communications link. A sending device applies a 16- or 32-bit polynomial to a block of data that is to be transmitted and appends the resulting cyclic redundancy code to the block. The receiving end applies the same polynomial to the data and compares its result with the result appended by the sender. If they agree, the data has been received successfully. If not, the sender can be notified to resend the block of data.

In the preferred embodiment, the fingerprint table, for a given fingerprint value, contains the first block identified by a block identifier (BLOCK-ID) with that fingerprint. The chain table, in that embodiment, is bi-linked and contains, for each real block, its predecessor and successor in the list of blocks with equal fingerprint and the reference count of the corresponding block and the fingerprint of the block. The reference table, in that embodiment, is continuously numbered and contains at least an entry for each real block. That entry preferably consists of the mentioned BLOCK-ID.

In order to enable dynamic expansion of the reference table in accordance with the above-mentioned process for optimizing the storage area of the storage medium, in a further embodiment, a particular storage area on the storage medium is reserved for the reference table and thus can not be occupied by real (user) data. The real data is only stored in a real sector wherein occupation of the real sector advantageously can move from outer tracks to inner tracks of the storage medium.

According to yet another embodiment, the reference table is stored outside the storage medium of the storage device, preferably in an Electronically Erasable Programmable Read-Only Memory (EEPROM/Flash RAM) being part of the storage device or a virtual RAM disk storage being part of the main storage of an underlying computer system.

BRIEF DESCRIPTION OF THE DRAWINGS

In the following, the present invention is described in more detail by way of preferred embodiments from which further features and advantages of the invention become evident wherein.

DETAILED DESCRIPTION OF THE PREFERRED EMBODIMENTS

Figure 1A:
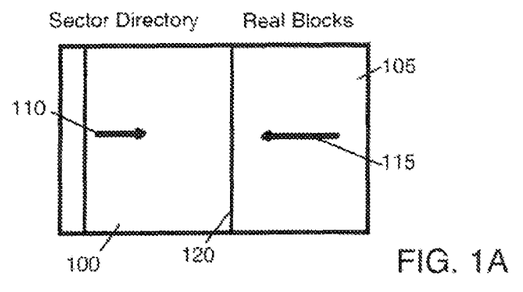
FIGS. 1A and 1B depict schematic views of an available storage space of a storage device for illustrating segmentation of the storage medium into two different areas (FIG. 1a) and for illustrating the principle of expandable sector storage (FIG. 1b) in accordance with the invention.
Figure 1B:
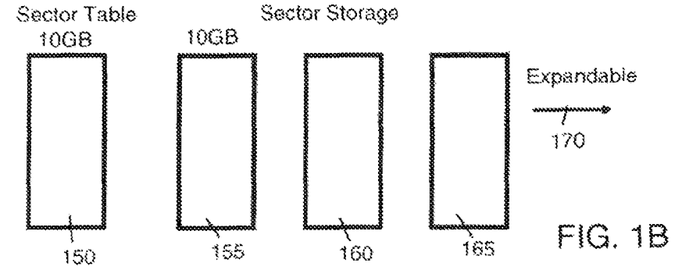

FIGS. 1A and 1B schematically show the available storage space of a storage medium of an underlying storage device, the storage space being arranged in accordance with the invention. The underlying storage device, as mentioned above, can be any storage device storing information in continuous data blocks like sector-oriented magnetic hard disk drives, optical disk drives or tape storage devices, and even semiconductor storage devices emulating or virtually realizing hard disk drives like solid hard disks or RAM disks.

FIG. 1A, more particularly, illustrates how the underlying storage medium is segmented into two different storage areas 100, 105, separated by a divider 120 shown for illustrative purposes. The first area 100 containing a sector directory (e.g. implemented as a table or the like) used for operational administration of the underlying storage device according to the mechanism described hereinafter and the second area ('Real Sector') 105 representing physical storage space for physically storing data. In FIG. 1A it is further illustrated by the two arrows 110, 115, that the size of each of the two storage areas 100, 105 can be adapted dynamically during operation of the underlying storage device, mainly depending on the storage capacity requirements of the mentioned sector directory. The required storage size for storing the sector directory, again, mainly depends on the number of currently existing data duplicates on sector level to be administered by means of the sector directory.

FIG. 1B shows a similar segmentation according to another embodiment of the invention where a number of different storage devices or storage subunits are involved. In this scenario, the sector directory is stored on a storage medium 150 of a first storage device wherein the real blocks are stored on the storage media 155, 160, 165 of other devices. In this way, the sector storage area can be expanded nearly arbitrarily, as indicated by arrow 170.

In the following it is assumed that, for each block to be written into a sector of the underlying HDD, a fingerprint value (fn) can be calculated. A known example for a fingerprint used in storage media is the above mentioned mechanism of Cyclic Redundancy Checking (CRC). CRC is a method of checking for errors in data that has been transmitted on a communications link whereby a sending device applies a 16-bit or 32-bit polynomial to a block of data that is to be transmitted and appends the resulting cyclic redundancy code (CRC) to the block. The receiving end applies the same polynomial to the data and compares its result with the result appended by the sender. If they agree, the data has been received successfully. If not, the sender can be notified to resend the block of data.

Figure 2:
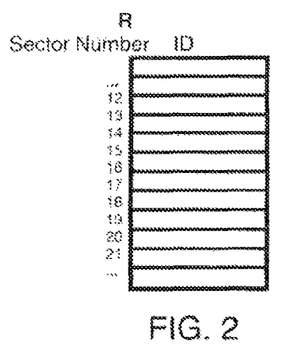
FIG. 2 depicts a reference table according to the preferred embodiment of the invention.

The mechanism for reducing storage occupancy in accordance with the invention, as illustrated in FIG. 1A, is based on segmentation of the storage area of the HDD or other storage device into two different areas, the first area containing a sector table and the second area intended for physically storing data. In that sector table area, there is stored a reference table R containing at least one entry for each real block of data. As illustrated in FIG. 2, in the preferred embodiment, the possible entries of that table are continuously numbered whereby each entry comprises a unique identifier (ID) of a stored block.

Figure 3:
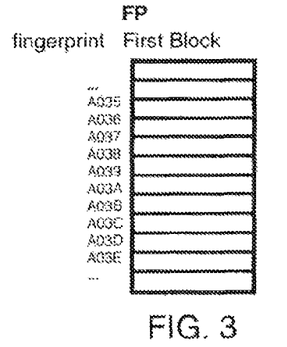
FIG. 3 depicts a fingerprint table according to the preferred embodiment of the invention.
Figure 4:
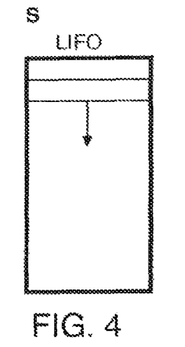
FIG. 4 depicts a LIFO stack of free blocks according to the preferred embodiment of the invention.
Figure 5:
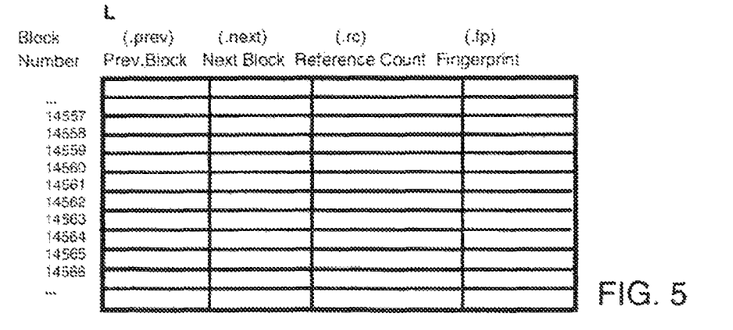
FIG. 5 depicts a linkage/chain table according to the preferred embodiment of the invention.

The sector table area also includes a fingerprint table 'FP'. As illustrated by the preferred embodiment shown in FIG. 3, the FP table contains, for each possible fingerprint value A034, A035, ..., the ID of the first block with that fingerprint. In addition, it comprises a LIFO (last in—first out) stack U (FIG. 4) of unused (real) blocks and a doubly-linked table L (FIG. 5) that comprises for a given block indicated by block number ..., 14557, 14558, ... the following information:

the block's predecessor or previous block (column 'prev') in the list of blocks with identical fingerprint value;

the block's successor or next block (column 'next') in the list of blocks with identical fingerprint value;

the block's reference count (column '.rc'); and the block's fingerprint value (column '.fp').

The number of available fingerprint values should be on the order of the number of real blocks available in the HDD. In the preferred embodiment, the number of fingerprints is equal to the number of blocks which guarantees that the average number of blocks with equal fingerprint value is smaller than 1. Even in case that in some lists of the above tables the number of blocks with identical fingerprint is larger than 1, then other fingerprint values are not realized (or are not presented) at all and the inequality of a new block compared with all blocks already stored on the HDD is ascertained also without a physical read of the block.

The following are examples for the calculation of the table sizes showing that the tables require less than 2% of memory:

Assume that 'n' is the number of bytes required for storing block numbers. For example, four bytes (thirty-two bits) are sufficient up to a storage capacity of two terabytes of the underlying storage device if the block size is 512 byte (2^32*512) and three bytes are sufficient for a storage capacity of 16 million blocks.

The resulting sizes of each of the above tables is:

Size (R)=#sectors*n;
size (FP)=#fingerprints*n;
size (U)=#blocks*n;
size (L)=#blocks*4*n.

Thus, in case of #sectors=#blocks=#fingerprints the resulting table size is #blocks*7*$n$.

The above calculation shall now be illustrated by the following four different quantitative estimations a)-d):

2 GB HDD: Provides 1 million blocks (<2^24) of block size 2048 byte; therefore three bytes ($n$=3) are sufficient, i.e. 21*1.000.000=21 MB (can even be kept in an EEPROM disposed in the HDD); a)

30 GB HDD: Provides 15 million blocks (<2^24) of block size 2048 byte; therefore three bytes are sufficient, i.e. 21*15.000.000=315 MB (is about 1.05% of the entire storage capacity of the HDD); b)

100 GB HDD: Provides 50 million blocks (<2^32) of block size 2048 byte; therefore four bytes ($n$=4) are sufficient, i.e. 28*50.000.000=1.4 GB (is about 1.4% of the entire storage capacity of the HDD); c)

8 TB HDD: Provides 4 billion blocks (<2^32) of block size 2048 byte; therefore four bytes are sufficient, i.e. 28*4.000.000.000=112 GB (is about 1.4% of the entire storage capacity of the HDD). d)

Statistical investigations have revealed that data stored on block-oriented server storage devices, on an average scale, contain up to 30% of duplicate files, and non-compressed picture formats like .bmp files often contain equally colored areas, which are stored as identical blocks on the storage device (e.g. black or white areas in these pictures), even for different pictures. In the following it is described how formatting or reading and writing blocks are performed or executed in the preferred embodiment, based on the above described storage device architecture. It should be noted that the necessary procedural steps do not depend on the underlying storage device technology and thus can be used either in a hard disk storage device or any other storage device where data are stored as data blocks.

Figure 8:
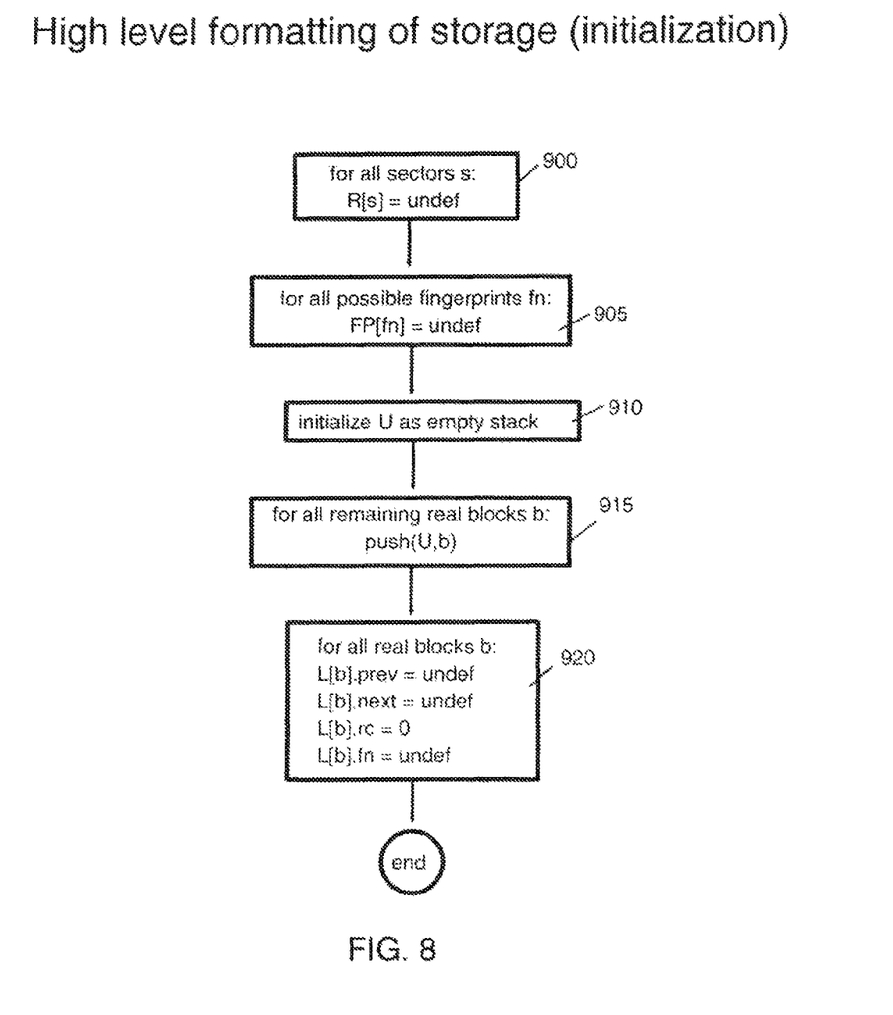
FIG. 8 is a flow diagram illustrating a HIGH-LEVEL FORMATTING procedure conducted in a Hard Disk Drive (HDD) in accordance with the invention.
Figure 9A:
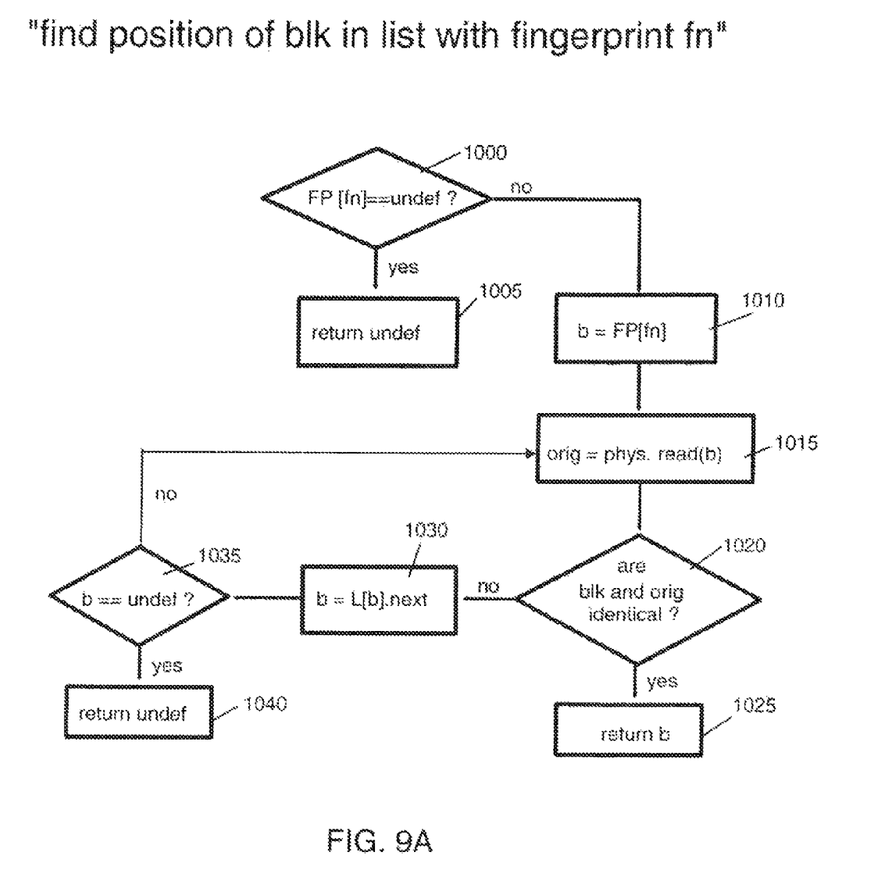
FIG. 9A is a flow diagram illustrating a procedure for FINDING THE POSITION OF A BLOCK IN A LIST USING A FINGERPRINT conducted in an HDD in accordance with the invention.
Figure 9B:
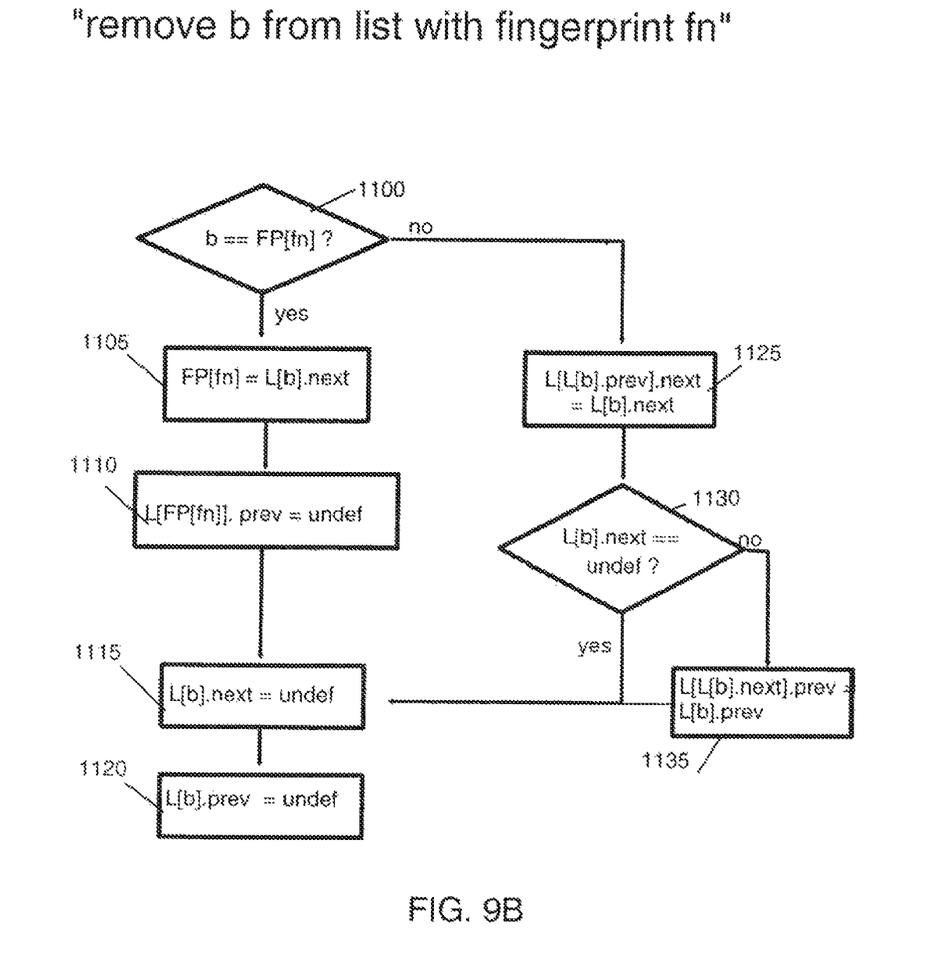
FIG. 9B is a flow diagram illustrating a procedure for REMOVING A BLOCK FROM A LIST USING A FINGERPRINT conducted in an HDD in accordance with the invention.
Figure 9C:
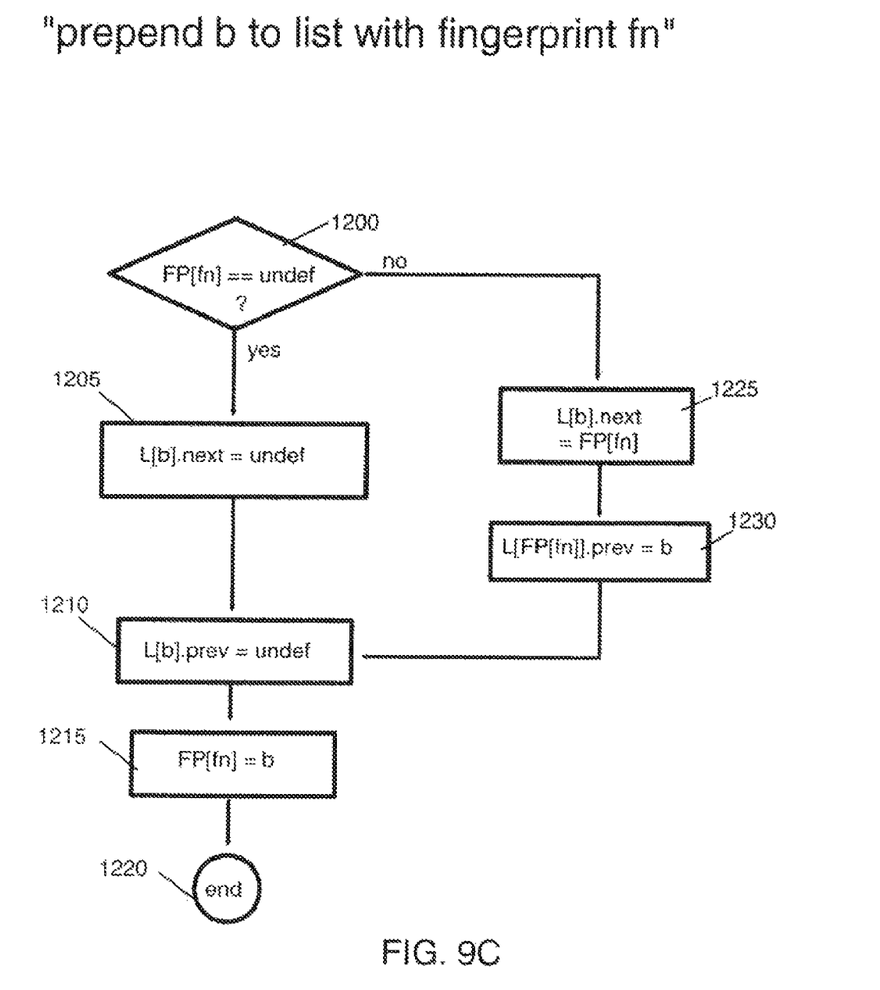
FIG. 9C is a flow diagram illustrating a procedure for PREPENDING 'B' TO LIST WITH FINGERPRINT FN conducted in an HDD in accordance with the invention.
Figure 10A:
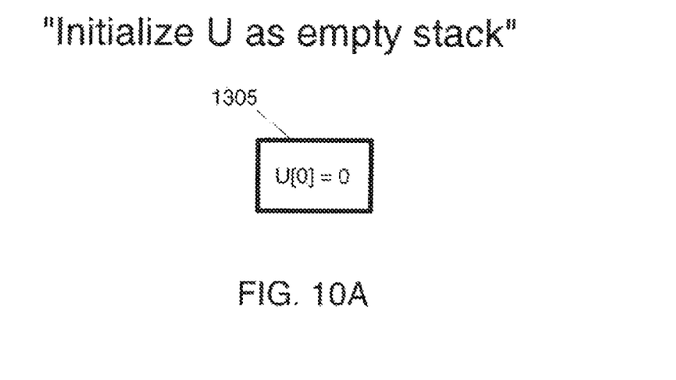
FIG. 10A is a flow diagram illustrating INITIALIZATION OF AN EMPTY STACK.
Figure 10B:
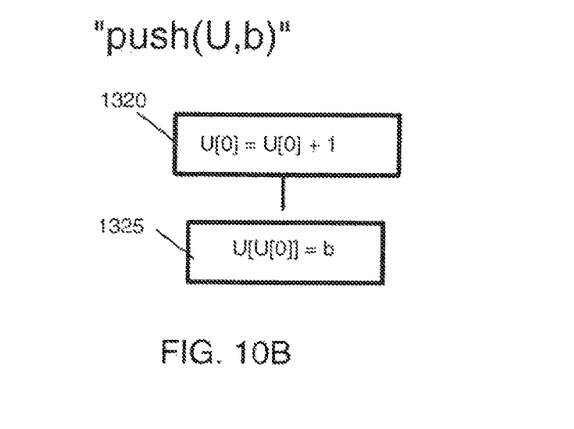
FIG. 10B is a flow diagram illustrating an operation of PUSHING AN ELEMENT ONTO A STACK.
Figure 10C:
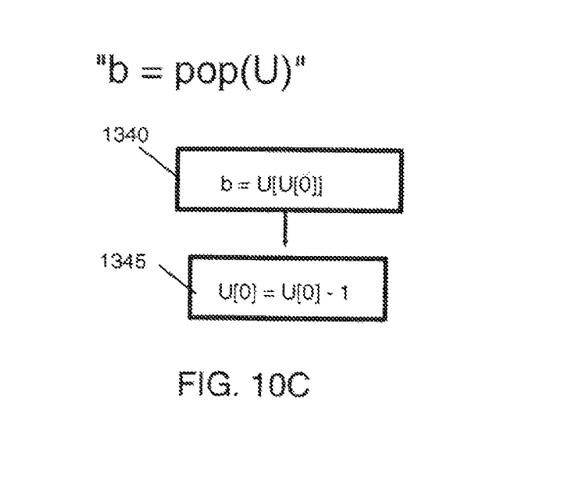
FIG. 10C is a flow diagram illustrating an operation of RETRIEVING THE LAST PUSHED ELEMENT FROM THE STACK.

Referring now to FIGS. 6A to 9C it is described in more detail by way of flow diagrams how the particular operations 'BLOCK WRITE', 'BLOCK READ', 'HIGH-LEVEL FORMATTING', 'FINDING THE POSITION OF A BLOCK IN A LIST', 'REMOVING A BLOCK FROM A LIST' and 'INSERTING A BLOCK INTO A LIST' (the last three operations by using a fingerprint) are performed by one or more computers in a sector-oriented storage in accordance with the invention as are the stack operations depicted in FIGS. 10A-10C. Therefore, as would be understood by those skilled in the art, these Figures should also be understood as being illustrative of programming of computers or processors to carry out the illustrated sequence of operations. The storage occupancy reduction program in accordance with the invention is stored on a machine-readable medium such as a disk storage for execution by the computer, via RAM, where the storage occupancy reduction program is the program which performs the claimed storage occupancy reduction function. These operations and method of operating a storage device are sufficient to guarantee that any block is stored exactly once in the storage medium and that different sectors containing the same block only contain references to this one block while limiting the processing overhead to do so. The mechanism and method in accordance with the invention must quickly check for a block, blk, that is already stored on the storage medium which can be very large. This reduction in processing time is achieved by calculating a fingerprint for block blk and then quickly searching the relatively short list of blocks already present with the same fingerprint, fn. It should be noted that blocks containing different data may, nevertheless, result in the same fingerprint being calculated. However, since the number of possible fingerprints which can result from calculation based on the data content of block is very large, the list of blocks having different content which may have the same (or any given) fingerprint will be a very small fraction of the number of blocks stored and the search can thus be performed very quickly on a list of blocks which will generally be very short.

Block Write Operation

Figure 6A:
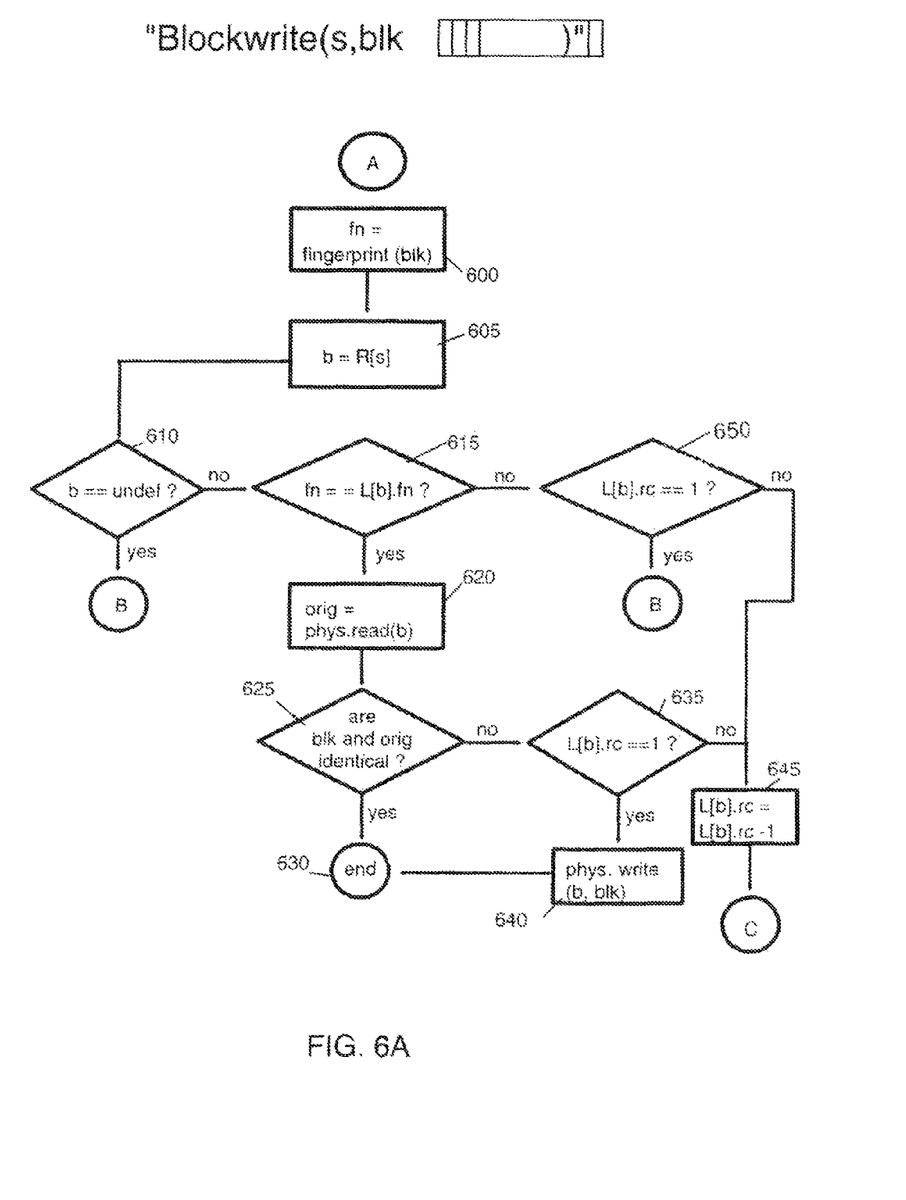
FIGS. 6A, 6B and 6C comprise a multiple-part flow diagram illustrating a BLOCK WRITE procedure conducted in an HDD device in accordance with the invention.
Figure 6B:
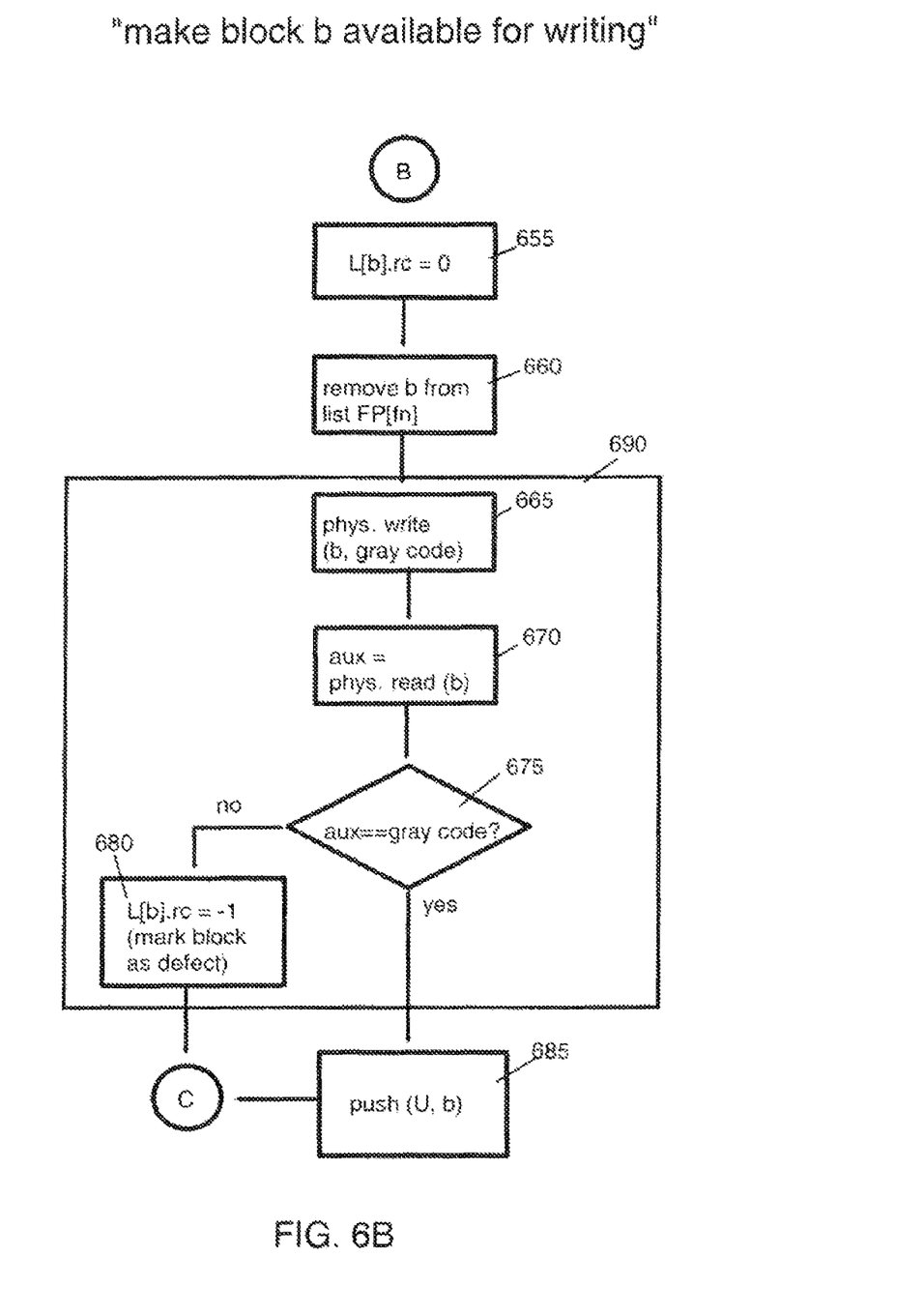
Figure 6C:
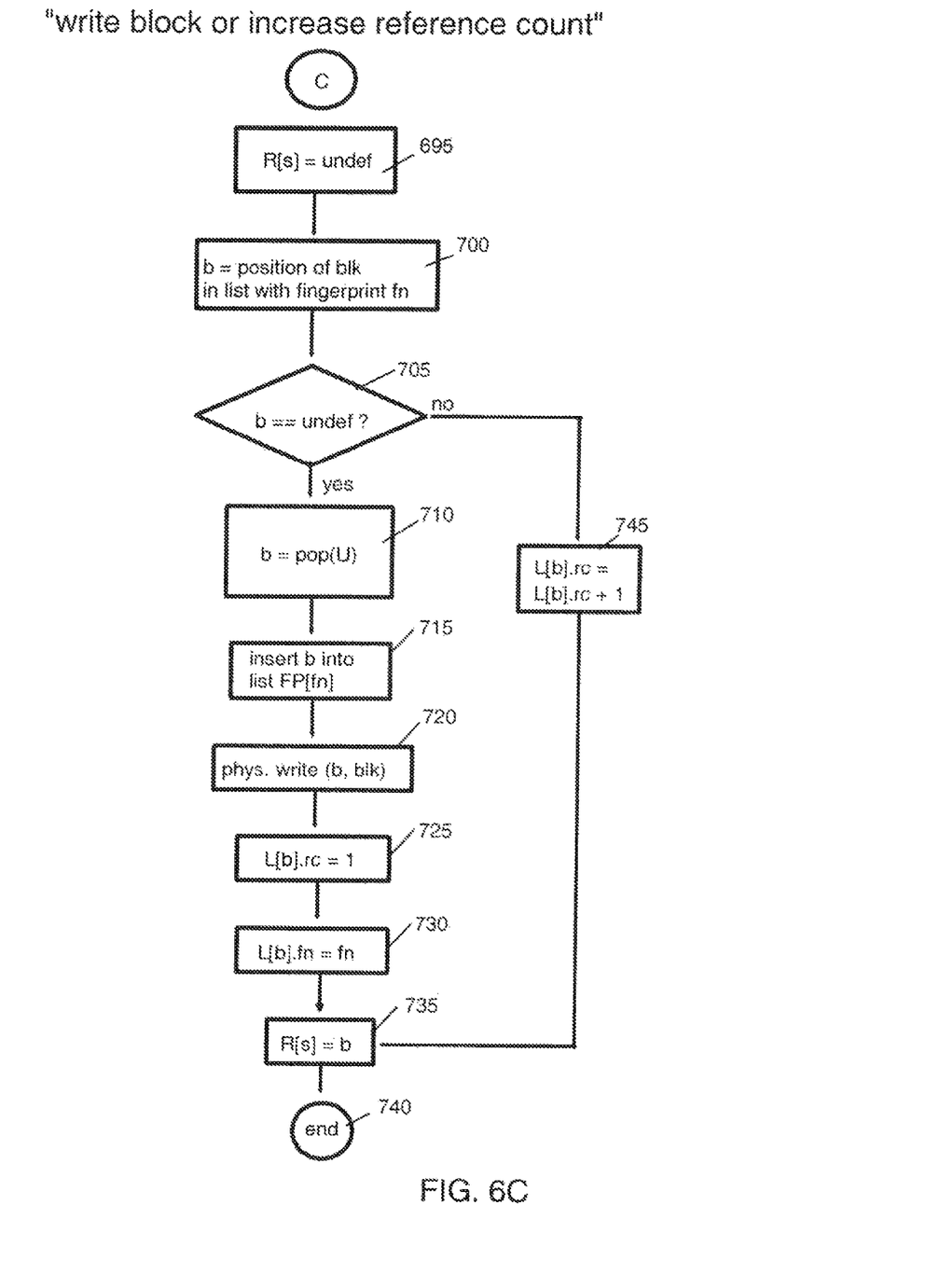
Figure 7:
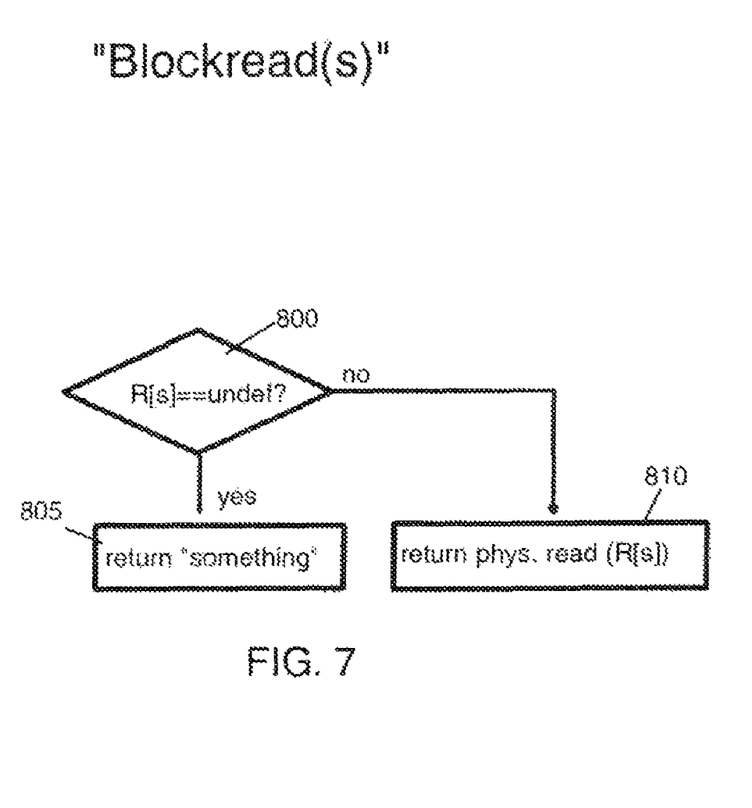
FIG. 7 is a flow diagram illustrating a BLOCK READ procedure conducted in an HDD device in accordance with the invention.

For the present BlockWrite operation it is assumed that a data block 'blk' is to be written at a position of the HDD designated with block number 's'. For that operation, procedural steps shown in FIGS. 6A-6C are performed. It is noted that the three parts of the entire flow diagram are linked at cardinal points 'B' and 'C', respectively.

In first step 600 shown in FIG. 6A, for the bit pattern of the block 'blk', a fingerprint 'fn' is calculated. An appropriate method for calculating the fingerprint is the above-mentioned known CRC mechanism although other appropriate and possible techniques for computing a fingerprint will be evident to those skilled in the art. Next, the HDD position number, s, at which the block is to be written is looked up 605 in the reference table R at block position and the resulting ID entry 'b' is checked in the next step 610 to determine if the entry 'b' is undefined ('undef'). If this condition is fulfilled (i.e. b is not defined because nothing has been previously stored for sector s) then the procedure continues with step 655 shown in FIG. 6B (through linking cardinal point B). If the condition is not fulfilled (i.e. b is already defined) then it is checked in next step 615 by means of the linkage table L if the above calculated fingerprint 'fn' is identical with the fingerprint value stored in table L for the present block entry 'b'.

If condition 615 is fulfilled then in step 620 the whole bit pattern of 'b' is read and stored in 'orig'. In the following step 625 it is then checked if the bit pattern of block 'blk' is identical with the bit pattern 'orig'. If so then the procedure is terminated 630 because block 'blk' is already in place (blk=orig) in storage. Otherwise it is further checked 635 if the reference count 'rc' for the present block 'b' contained in the linkage table L is equal to '1'. If so then the bit pattern 'b' of block 'blk' is physically written 640 to the HDD at block position 's' and the procedure terminated 630 accordingly. Otherwise, in step 645, in the linkage table L the reference count 'rc' of 'b' is decreased by '1'.

Referring now back to step 615, if the fingerprint 'fn' calculated by means of the linkage table L is not identical with the fingerprint value stored in table L for the present block entry 'b', it is checked in step 650, if the reference count value 'rc' contained in table L for entry 'b' is equal to '1'. If so, the procedure is continued with the next step linked to point shown in FIG. 6B. Otherwise the reference count 'rc' is decreased by '1' in following step 645.

Now referring to FIG. 6B, it is described how the above BlockWrite procedure is continued at cardinal point 'B' to make entry available for writing with step 655 where the reference count value of entry 'b' in the linkage table L is set '0'. In next step 660 the entry 'b' is removed from the list contained in the fingerprint table FP for fingerprint 'fn'. The underlying procedure for the removal of entry is described in more detail referring to FIG. 9B.

The following steps 665-680 surrounded by line 690 relate to a mechanism for handling physically defective blocks in a HDD and thus represent an optional but further advantageous perfecting feature of the invention. In step 665 of that optional procedure, a gray code is physically be written at block 'b' of the HDD. In the following step 670, that block 'b' is physically read and stored temporarily as variable 'aux'. In step 675 it is then checked if the data pattern temporarily stored in 'aux' is equal with the original gray code. If not, the present block can be assumed to be defective and thus in the following step 680 that block is marked as defective simply by setting the reference count 'rc' of that block to '−1'. Otherwise, whether or not the optional procedures indicated by line 690 are performed, the procedure continues with step 685 where a stack operation push(U, x) with x='b' in the present case is executed, making block 'b' available as an unused block. The necessary stack operations are illustrated in detail with reference to FIGS. 10A-10C.

In FIG. 6C it is illustrated how the presently described procedure continues at cardinal point 'C'. In the first step 695 the entry for block 'b' in the reference table R is set 'undef' (=undefined). In the following step 700, the position of a block 'blk' with fingerprint value 'fn' in the list with all blocks of fingerprint value 'fn' (FP[fn]) is determined. The underlying procedure for finding that position is described in more detail hereinafter referring to FIG. 9A. In following step 705 it is checked if b is undefined ('undef') indicating, that no block in the list is identical to 'blk'. If, YES', the above described pop(U) operation is performed with the LIFO stack U in step 710 to receive a free block for storing. In the next step 715 'b' is inserted into the fingerprint table FP with the above calculated fingerprint value fn. For the details of that insertion procedure it is referred to the following description of FIG. 9C.

Similarly to preceding step 640, in present step 720 the bit pattern of block 'blk' is physically written to the HDD at real block 'b' accordingly. Thereafter, the reference count 'rc' of 'b' is set 725 to the value '1' in the linkage table L, because the block 'blk' is stored for the first time on the storage device. In addition, the fingerprint value of table L is set 730 with the above calculated value fn. In the last step 735, at the position s of the reference table R, the value b is entered. Then the present procedure is terminated by step 740.

However, if the check box 705 reveals 'NO', i.e. that the entry b of the reference table R is not undefined ('undef'), then the procedure continues with step 745 where the reference count 'rc' of 'b' in the linkage table L is increased by '1'. The reason for this alternating path is that an already existing block 'b' with content identical to 'blk' was found in the list, and the new reference to that block increases the number of blocks referring to it.

Thus, in summary, the block write operation in accordance with the invention first determines the fingerprint of the block to be written and then searches to determine if a block with the same fingerprint already exists in memory. This search is performed by looking up all blocks in a doubly linked list of blocks with fingerprint fit The first element of this list is accessed in a constant time by the array FP. FP[fn] is either 'undef' (e.g. an empty list with blocks of fingerprint fn) or holds the first physical block with fingerprint fn. If a stored physical block b of content identical to blk is found, all that has to be done is to set the reference for s (R[s]=b) and increment the reference count for block b by 1.

That is, if no block is already stored which has the same fingerprint, the block to be written is not a duplicate of any other previously written block. While blocks having different content could have the same fingerprint computed for them, this screening by fingerprints reduces the number of block which must be considered to a list which is generally very short (and, as will be demonstrated, will only be a relatively few blocks, on average) compared to the number of blocks which can be stored in a potentially very large memory.

Block Read Operation

It is now assumed accordingly that a data block with block number 's' is to be read from the storage device. The following are the steps sufficient for that block read operation in accordance with the preferred embodiment of the present invention.

In step 800 (FIG. 7) it is checked if the entry at position 's' is undefined ('undef'). If so, in step 805, an arbitrary bit pattern is returned. Otherwise, in step 810, the block 'blk' at the position 's' of the reference table R is physically read and returned.

High-Level Formatting Operation

Referring now to FIG. 8, a preferred embodiment of a procedure for high-level formatting a HDD is described in detail by way of the depicted flow diagram. This procedures serves for initializing an HDD for applying the HDD operation method according to the invention.

In a first step 900 (FIG. 8), for all sectors s of the HDD, the corresponding entries of the reference table R are set undefined ('undef'), namely all entries of R. Then, in the fingerprint table FP, for all possible fingerprint values fn, FP[fn] is set 905 undefined ('undef'). In step 910, the LIFO stack U is initialized as an empty stack. In the following step 915, for all remaining real blocks b contained in the area 105 shown in FIG. 1A, the above described push operation, as shown too in FIG. 8, is applied for x=b. In the final step 920 of the present formatting procedure, for all real blocks b, the corresponding entries for the parameters previous block 'prev', next block 'next' and fingerprint value 'fn' contained in the linkage table L are set undefined ('undef') wherein the entry for the parameter reference count 'rc' is set '0'.

Finding the Position of a Block in a List Operation

According to the preferred embodiment illustrated by way of the flow diagram depicted in FIG. 9A, the procedure starts with step 1000 where it is checked if a given fingerprint entry of the fingerprint table FP is undefined ('undef'). If 'yes' then it is returned 1005 'undef' since the list of blocks with fingerprint fn is empty in this case. Otherwise, the first block of the list of blocks with fingerprint fn 1010 is denoted by 'b'. In the following step 1015 the block 'b' is physically read and temporarily stored as variable 'orig'. Then it is checked 1020 if the bit patterns of blk and orig are identical. If so, then the block ID 'b' is returned 1025. Otherwise, the next block stored in column 'next' of the linkage table 'L' for present block 'b' is set 1030 as a new block 'b'. Thereafter it is checked 1035 if the new block 'b' is undefined ('undef') (i.e. the list is completely traversed). If so 'undef' is returned 1040. Otherwise it is jumped back to step 1015 and this step executed for a next block 'b'. Thus the block ID of a block in the list identical to 'blk' is returned, if one exists, and otherwise 'undef' is returned as indication of non-existence of such a block.

Removing a Block from a List Operation

In the preferred embodiment illustrated in FIG. 9B, the procedure for removing a block 'b' with a fingerprint value 'fn' from the linkage table L starts with checking 1100 in the fingerprint table 'FP' if block 'b' is the first block in that list. If so then the fingerprint value 'fn' of the next block contained in linkage table 'L' is fetched and in the fingerprint table 'FP' set 1105 as first block with that 'fn' value. Thereafter in the linkage table 'L' the corresponding entry with that 'fn' value is fetched and the corresponding 'prev' value set 1110 'undef'. In the following steps 1115 and 1120 the 'next' and 'prev' values of the present block 'b' are both set 'undef'.

Referring back to step 1100, if the current block 'b' is not the first block in the list, it is jumped to the entry for the previous block 'prev' of present block 'b' in the linkage table 'L' and the next block 'next' entry for that entry is set 1125 as the next block 'next' for the current block 'b' in the 'L' table. In the next step 1130 following in the path it is then checked if the status of the current entry set in step 1125 is 'under'. If so, this path is continued with step 1115 followed by step 1120 as described beforehand. Otherwise, an intermediate step 1135 is executed where it is jumped to the entry for the next block 'next' of present block 'b' in the linkage table 'L' and the previous block 'prev' entry for that entry is set 1125 as the previous block 'prev' for the current block 'b' in the 'L' table.

Prepend 'B' to List with Fingerprint FN

As illustrated by the preferred embodiment for this procedure for insertion of a block 'b' having a fingerprint value 'fn' into a linkage table 'L' and a fingerprint table 'FP' shown in FIG. 9C, it is first checked 1200 if the underlying entry for 'fn' in the fingerprint table 'FP' is 'undef'. If so then the next block entry and the previous block entry of the 'L' table for 'b' are both set 1205, 1210 'undef'. After this 'b' is inserted with its fingerprint value 'fn' in the 'FP' table and the procedure is terminated 1220, i.e. the list consists of block 'b' in this case only.

If the condition in step 1200 is not being fulfilled (the list of blocks with fingerprint 'fn' is not empty) then the procedure continues with step 1225 of a second path where the present fingerprint value 'fn' gathered from the fingerprint table 'FP' is set for next block 'next' contained in the linkage table 'L'. Thereafter the previous block 'prev' contained in the linkage table 'L' for that fingerprint is set 1230 'b' (b is pre-pended to the list FP[fn]).

It is important to note that, of all the above-described operations, only the block write operation requires more than a constant time and that the block read operation only has the small and constant additional processing burden of following the reference R[s]. Therefore, the effect of the invention on memory input/output rates is very slight while optimally reducing memory occupancy by eliminating all duplication of blocks of stored data with a granularity potentially much smaller than files.

It is also noteworthy that the above described tables R, FP, L and the LIFO stack U, in part or even all, can be implemented in a static approach with predefined size or in a dynamic approach where the size is dynamically adapted to the actual storage requirements for storing the corresponding necessary data. The above described search procedures for finding data duplicates on storage sector level can be implemented by way of a known indexing mechanism in order to enhance overall processing performance of the described storage management mechanism.

In summary, it is clearly seen that the invention provides for optimally reduced occupancy of memory devices with minimal penalty in processing burden or use of storage. For example in case c discussed above in regard to a 100 GB HDD, providing 50,000,000 blocks of 2048 byte storage, if working with 24-bit fingerprints, then even on a fully written memory of totally different blocks, the average length of a list of blocks having the same fingerprint will be $50,000,000/2^{24}=2.9802$, or, on average, less than three blocks which must be read to determine if a block to be stored is a duplicate of a block previously written. This meritorious effect is increased with increasing memory capacity since the average number of blocks which must be read remains relatively small while the memory capacity may greatly increase and the difference between the number of blocks of storage and the number of blocks which must be read to identify or disprove the presence of a block blk becomes increasingly great. Further, although the invention has been described for a hard disk drive (HDD) only, it is understood hereby, that the invention can be applied accordingly in a tape storage or semiconductor storage or any CPU-based storage using block memory devices, if that storage comprises segmentation into blocks as described beforehand.

Further, the invention can also be implemented either in a storage area network (SAN) or a network attached storage (NAS) environment. A SAN is a high-speed special purpose digital network that interconnects different kinds of data storage devices with associated data servers on behalf of a larger network of users. Typically, a storage area network is part of the overall network of computing resources for an enterprise. A storage area network is usually clustered in close proximity to other computing resources such as IBM S/390 mainframe computers but may also extend to remote locations for backup and archival storage, using wide area network carrier technologies such as asynchronous transfer mode or synchronous optical networks.

A NAS is a hard disk storage that is set up with its own network address rather than being attached to the department computer that is serving applications to a network's workstation users. By removing storage access and its management from the department server, both application programming and files can be served faster because they are not competing for the same processor resources. The network-attached storage device is attached to a local area network (typically, an Ethernet network, the most widely-installed local area network (LAN) technology) and assigned an IP address. File requests are mapped by the main server to the NAS file server. A network-attached storage consists of hard disk storage, including multi-disk RAID (redundant array of independent disks) systems, and software for configuring and mapping file locations to the network-attached device. Network-attached storage can be a step toward and included as part of the above mentioned more sophisticated storage system known as SAN.

In these environments, as pointed out in FIG. 1b, the sector table (including the above described tables) is separated physically from the sector storage, i.e. both are implemented on different disk storage devices (e.g. HDDs). Hereby it is enabled to implement a large sector table that is used to access sector storages arranged in a stack of other HDDs. It is mentioned hereby that today's HDD controllers are able to manage 100 or even more HDDs. The mentioned stack of sector storage HDDs in case of need can be extended easily insofar as the sector table arranged on the first HDD has only to be enlarged.

It is further to be noted that the sector table, in another embodiment, can also be arranged in a solid-state random access memory (RAM) thus enhancing processing speed for managing the sector table.

Thereupon it is noteworthy that although the underlying storage device is an HDD storage in the present embodiment, the concepts and mechanisms described hereinafter can also be applied to other types of storage devices like semiconductor-based storages.

Having thus described our invention, what we claim as new and desire to secure by Letters Patent is as follows:

1. A method for managing digital data storage, the method comprising steps of:
 a computer segmenting a computer-readable, tangible storage device into a reference area and a block storage area and segmenting the block storage area into storage blocks of a common length;

the computer storing data information in respective storage blocks of the block storage area;

the computer generating respective reference information for the blocks of data, the reference information including respective fingerprint information based on bit patterns of respective first blocks stored on the computer-readable, tangible storage device and a linked list of other first blocks having different bit patterns but equal fingerprint values, the linked list being one of one or more linked lists wherein respective linked lists correspond to respective fingerprint values;

the computer storing the first blocks in the block storage area and the reference information in the reference area with reference information pointing to each corresponding first block, the reference information for the respective first blocks including respective fingerprint values for the first blocks based on respective bit patterns for the first blocks and the linked list of other first blocks having different bit patterns but equal fingerprint values, the computer determining a bit pattern of a subsequent block and a fingerprint value in accordance with the bit pattern of the subsequent block and checking the bit pattern of the subsequent block for being identical to a bit pattern of any of the first blocks previously stored at any location in the block storage area and identified in the linked list as having a fingerprint value equal to a fingerprint value of the subsequent block, and the computer storing the subsequent block and corresponding reference information in the block storage area and the reference area, respectively, of the computer-readable, tangible storage device if the bit pattern of the subsequent block is different from the bit pattern of all previously stored first blocks having the same fingerprint value and storing the subsequent block in the storage device as a reference referring to the corresponding first block without storage of the bit pattern of the subsequent block in the block storage area of the computer readable, tangible storage device if the bit pattern of the subsequent block is identical to any first block having the same fingerprint value.

2. The method as recited in claim 1, wherein the reference information stored in the reference area comprises at least one reference table containing at least one entry for each block, at least one fingerprint table containing fingerprint value information for each block and at least one chain table comprising a doubly linked list containing, for each block, at least information about blocks having equal fingerprint values.

3. The method as recited in claim 2, wherein the entries of the reference table are numbered consecutively.

4. The method as recited in claim 2, wherein each of the entries consists of at least one field containing a unique identifier for identifying a physical sector where the corresponding first block is stored in the block storage area.

5. The method as recited in claim 4, wherein the length of a reference field is defined as the maximum amount of required binary digits (bits) for physical sector IDs.

6. The method as recited in claim 2, wherein the fingerprint table contains, for each fingerprint value, a unique identifier of a first block stored in the block storage area corresponding to the fingerprint value.

7. The method as recited in claim 2, wherein the chain table contains, for a particular block, its preceding block in the linkage table having same fingerprint value, its successive block in the linkage table having same fingerprint value, a reference count, and its fingerprint value.

8. The method as recited in claim 1, wherein a reference counter is stored for each of the first blocks having a counter number counting a number of references to that first block in the reference area.

9. The method as recited in claim 8, wherein the reference counter identifies how many times its associated first block is referred to in the reference area.

10. The method as recited in claim 1, wherein storage device is formatted so that the number of physical blocks equals the number of entries of the reference table.

11. The method as recited in claim 10, further comprising a further step of:

the computer updating the number of physical blocks on a periodic time basis.

12. A computer system for managing digital data storage in a digital storage device, the computer system comprising:

one or more processors, one or more computer-readable memories, one or more computer-readable, tangible storage devices, and program instructions stored on at least one of the one or more storage devices for execution by at least one of the one or more processors via at least one of the one or more memories, the program instructions comprising:

program instructions to configure the one or more processors to segment a computer-readable, tangible storage device into a reference area and a block storage area and to segment the block storage area into storage blocks of a common length;

program instructions to configure the one or more processors to store data information in respective storage blocks of the block storage area;

program instructions to configure the one or more processors to generate respective reference information for the blocks of data, the reference information including respective fingerprint information based on bit patterns of respective first blocks stored on the computer-readable, tangible storage device and a linked list of other first blocks having different bit patterns but equal fingerprint values, the linked list being one of one or more linked lists wherein respective linked lists correspond to respective fingerprint values;

program instructions to configuring said one or more processors to store the first blocks in the block storage area and the reference information in the reference area with reference information pointing to each corresponding first block, the reference information for the respective first blocks including respective fingerprint values for the first blocks based on respective bit patterns for the first blocks and the linked list of other first blocks having different bit patterns but equal fingerprint values, program instructions to configure the one or more processors to determine a bit pattern of a subsequent block and a fingerprint value in accordance with the bit pattern of the subsequent block and checking the bit pattern of the subsequent block for being identical to a bit pattern of any of the first blocks previously stored at any location in the block storage area and identified in the linked list as having a fingerprint value equal to a fingerprint value of the subsequent block, and program instructions to configure the one or more processors to store the subsequent block and corresponding reference information in the block storage area and the reference area, respectively, of the computer-readable, tangible storage device if the bit pattern of the subsequent block is different from the bit pattern of all previously stored first blocks having the same fingerprint value and to store the subsequent block in the storage device as a reference referring to the corresponding first block without storage of the bit pattern of the subsequent block in the block storage area of the computer-readable, tangible storage device if the bit pattern of the second block is identical to any first block having the same fingerprint value.

13. The system as recited in claim 12, wherein the reference information stored in the reference area comprises at least one reference table containing at least one entry for each block, at least one fingerprint table containing fingerprint information for each block and at least one chain table comprising a doubly linked list containing, for each block, at least information about blocks having equal fingerprint values.

14. The system as recited in claim 13, wherein the entries of the reference table are numbered consecutively.

15. The system as recited in claim 13, wherein each of the entries consists of at least one field containing a unique identifier for identifying a physical sector where the corresponding first block is stored in the block storage area.

16. The system as recited in claim 15, wherein the length of a reference field is defined as the maximum amount of required binary digits (bits) for physical sector IDs.

17. The system as recited in claim 13, wherein the fingerprint table contains, for each fingerprint value, a unique identifier of a first block stored in the block storage area corresponding to the fingerprint value.

18. The system as recited in claim 13, wherein the chain table contains, for a particular block, its preceding block in the linkage table having equal fingerprint value, its successive block in the linkage table having equal fingerprint value, a reference count, and its fingerprint value.

19. The system as recited in claim 12, further including instructions for configuring the one or more processors to provide a reference counter stored for each of the first blocks having a counter number counting a number of references to that first block in the reference area.

20. The system as recited in claim 19, wherein the reference counter identifies how many times its associated first block is referred to in the reference area.

21. The system as recited in claim 12, wherein the storage medium is formatted so that the number of physical blocks equals the number of entries of the reference table.

22. A computer program product for reducing data occupancy of a storage device, the computer program product comprising one or more computer-readable, tangible storage devices and program instructions stored on at least one of the one or more storage devices, the program instructions comprising:

program instructions to segment at least one computer-readable, tangible storage device into a reference area and a block storage area and to segment the block storage area into storage blocks of a common length;

program instructions to store data information in respective storage blocks of the block storage area;

program instructions to generate respective reference information for the blocks of data, the reference information including respective fingerprint information based on bit patterns of respective first blocks stored on the computer-readable, tangible storage device and a linked list of other first blocks having different bit patterns but equal fingerprint values, the linked list being one of one or more linked lists wherein respective linked lists correspond to respective fingerprint values;

program instructions to store the first blocks in the block storage area and the reference information in the reference area with reference information pointing to each corresponding first block, the reference information for the respective first blocks including respective fingerprint values for the first blocks based on respective bit patterns for the first blocks and the linked list of other first blocks having different bit patterns but equal fingerprint values, program instructions to determine a bit pattern of a subsequent block and a fingerprint value in accordance with the bit pattern of the subsequent block and checking the bit pattern of the subsequent block for being identical to a bit pattern of any of the first blocks previously stored at any location in the block storage area and identified in the linked list as having a fingerprint value equal to a fingerprint value of the subsequent block, and program instructions to store the subsequent block and corresponding reference information in the block storage area and the reference area, respectively, of the computer-readable, tangible storage device if the bit pattern of the subsequent block is different from the bit pattern of all previously stored first blocks having the same fingerprint value and storing the subsequent block in the storage device as a reference referring to the corresponding first block without storage of the bit pattern of the subsequent block in the block storage area of the computer readable, tangible storage device if the bit pattern of the subsequent block is identical to any first block having the same fingerprint value.

* * * * *